Aug. 19, 1924.

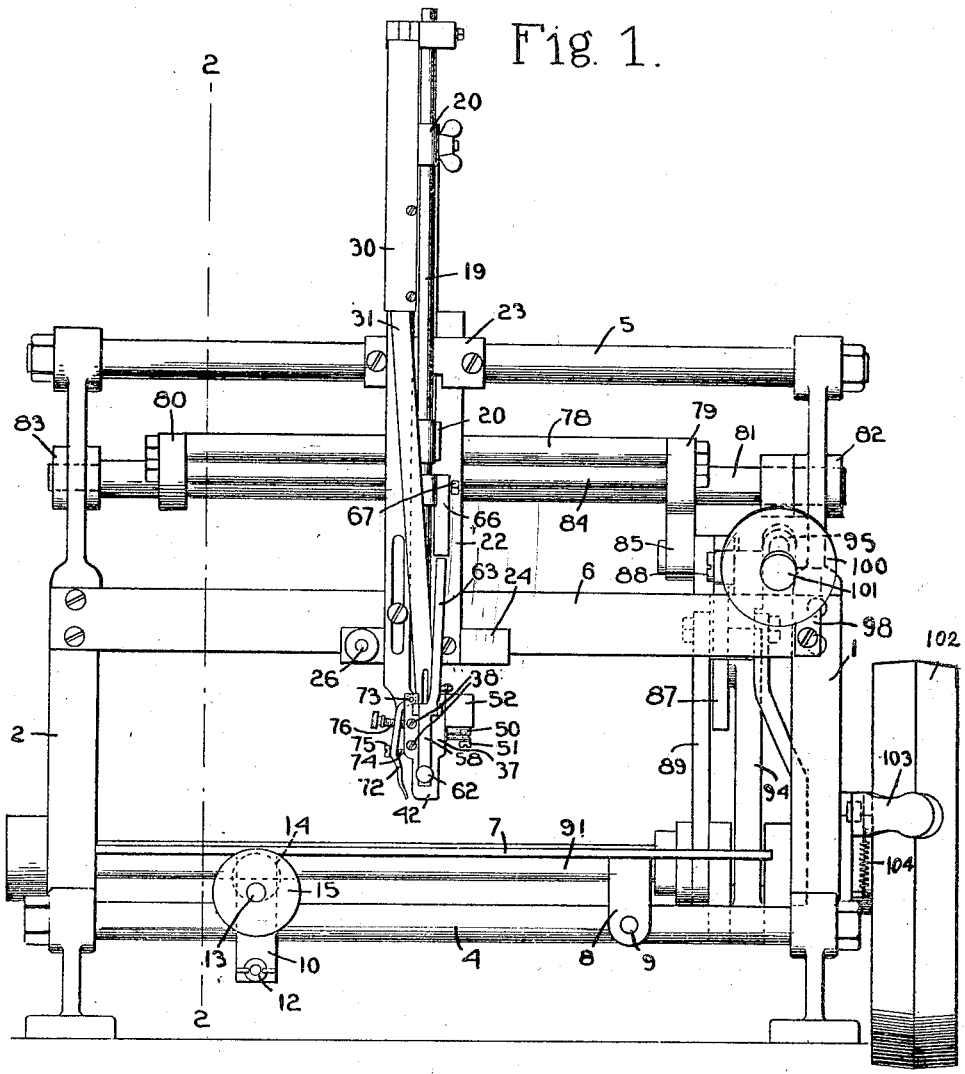

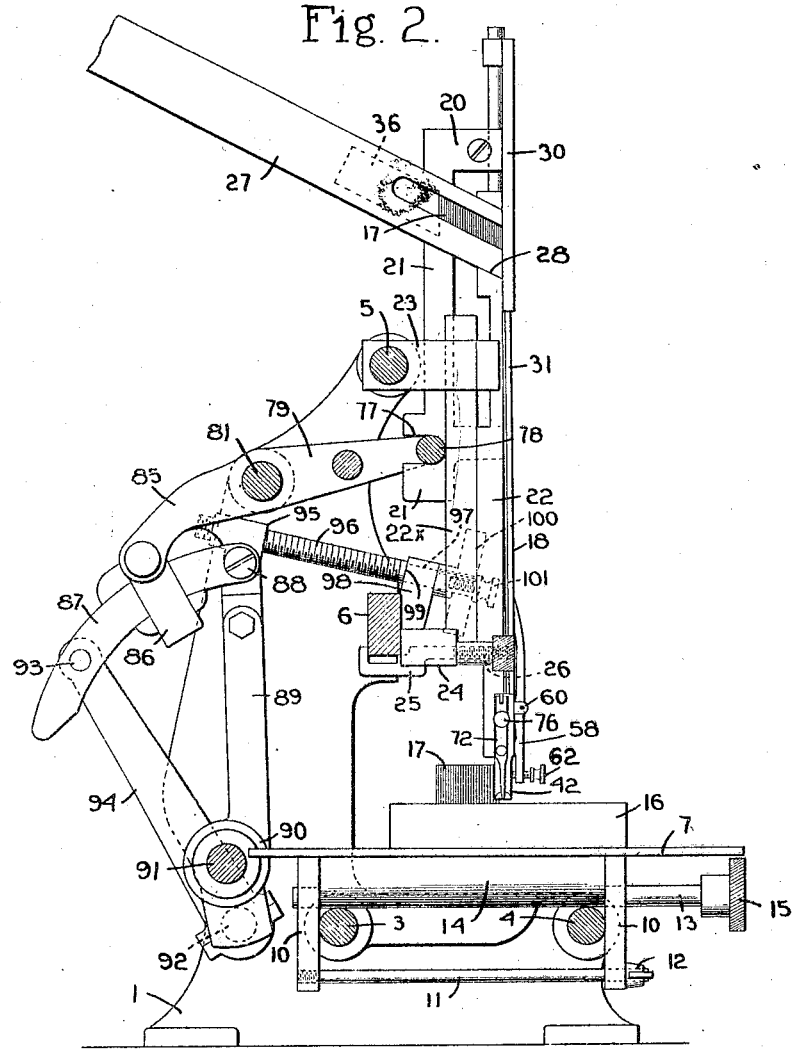
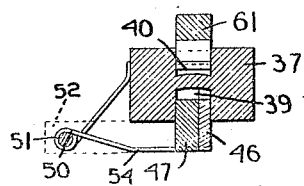

C. G. ANDERSON 1,505,686

MACHINE FOR AFFIXING AND ASSEMBLING UNITS UPON A BASE

Filed April 3, 1920    4 Sheets-Sheet 3

Inventor.
Carl G. Anderson
by Heard Smith & Tennant.
Attys

Aug. 19, 1924.  1,505,686
C. G. ANDERSON
MACHINE FOR AFFIXING AND ASSEMBLING UNITS UPON A BASE
Filed April 3, 1920   4 Sheets-Sheet 4

Inventor.
Carl G. Anderson
by Heard Smith & Tennant.
Attys.

Patented Aug. 19, 1924.

1,505,686

UNITED STATES PATENT OFFICE.

CARL G. ANDERSON, OF BOSTON, MASSACHUSETTS, ASSIGNOR TO JOHN E. SWANSON, OF BOSTON, MASSACHUSETTS.

MACHINE FOR AFFIXING AND ASSEMBLING UNITS UPON A BASE.

Application filed April 3, 1920. Serial No. 371,157.

*To all whom it may concern:*

Be it known that I, CARL G. ANDERSON, a subject of the King of Sweden, and resident of Boston, county of Suffolk, State of Massachusetts, have invented an Improvement in Machines for Affixing and Assembling Units upon a Base, of which the following description, in connection with the accompanying drawing, is a specification, like characters on the drawing representing like parts.

This invention relates to improvements in machines for affixing a series of units to a base and the principal object of the invention is to provide means for affixing and assembling a series of units upon a base to form a predetermined design. More specifically the object of the invention is to provide a machine for driving a series of units, such as slugs, into a base in a predetermined order in such a manner that the slugs when thus affixed to the base will produce a predetermined design or pattern which may be subsequently formed into a die, or used as a pattern for moulding dies of the character disclosed in my prior application, Serial No. 347,506, filed December 26, 1919.

The invention particularly is adapted for use in the production of such dies as are employed in cutting parts of shoes and is designed to set a series of slugs, having a form corresponding substantially to the cross section of the desired die, into a base of wood, or other soft material, in such a manner as to conform to the desired contour of the die. The device thus formed by the series of slugs may then be used either as a moulding pattern from which steel dies may be cast, or if desired the slugs may be finished and sharpened in such a manner that the assembled slugs may be united to form a die in the manner disclosed in my prior application aforesaid.

A further object of the invention is to provide an automatic machine which will successively drive, or otherwise set, a series of slugs into a base in such a manner that the face of the slug being driven or set will be caused to abut against the face of a previously driven slug.

A further object of the invention is to provide a novel feeding means for advancing the base as the slugs are being successively driven; preferably, the feeding of the base being accomplished by thrusting the slug about to be driven against the face of the driven slug with a sufficient force to advance the base.

A further object of the invention is to provide a novel positioning means for the slug about to be driven, said positioning means preferably being actuated in such a manner as to produce the desired feeding motion.

A further object of the invention consists in providing means for releasing slugs successively from a reservoir and delivering the same to the means which positions the slug about to be driven, the releasing means preferably being actuated directly from the driving means in such a manner as to deliver a slug from the reservoir in proximity to the positioning means while the latter is holding a positioned slug in the path of the driver so that as soon as the latter slug is driven a new slug will be introduced into the positioning means.

A further object of the invention is to provide a machine of the character described with means for enabling the base to which the units or slugs are affixed to be so guided as to cause the units or slugs when assembled therein to form a predetermined pattern.

A further object of the invention is to provide a unit or slug driving machine with a table for supporting the base into which the slugs are to be driven, which may be adjusted in angular relation to the path of the driving means so that the central axis of the units or slugs may be positioned either in perpendicular relation to the base or in such inclined relation thereto as may be desirable to produce the desired form of die.

A further object of the invention is to provide a unit or slug driving machine of the character above described with means for adjusting the driving mechanism relatively to the table which supports the base into which the units or slugs are to be driven.

A further object of the invention is to provide a unit or slug driving machine of the character described with means for adjusting the amplitude of reciprocation of the driving means, whereby units of different lengths may be set in a suitable base.

Other objects and features of the invention will more fully appear from the following description and the accompanying drawings and will be pointed out particularly in the annexed claims.

In the drawings:

Fig. 1 is a front elevation of a unit assembling or slug driving machine embodying my invention.

Fig. 2 is a transverse, vertical, sectional view on lines 2—2, Fig. 1.

Fig. 6 is a transverse, sectional view through the slug positioning means on lines 6—6, Fig. 3.

Figure 4:
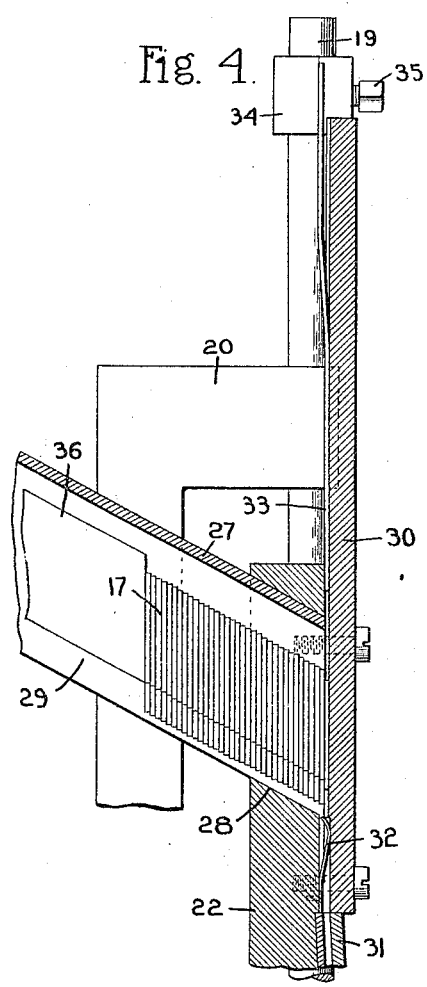
Fig. 4 is a vertical sectional view through the reservoir for supporting a series of units or slugs to be assembled and showing the means for retaining the same in said reservoir, a portion of the driving means and the means operable by said driving means to release and deliver a unit to the positioning means.

The machine illustrated in the accompanying drawings is particularly designed to set or drive into a suitable base a series of thin units or slugs, preferably having curved faces, and provided at their lower ends with penetrating prongs adapted to be imbedded into the base, which preferably is of wood presenting a face cut transversely of the grain of the wood. These units or slugs may desirably be of V-shape form corresponding to the cross section of a cutting die.

In the operation of the machine these units or slugs desirably are assembled with their curved faces abutting or contacting against each other in such a manner that a practically continuous wall is formed corresponding to the desired form of die. By reason of the nesting of the curved walls of the units or slugs they can be caused to contact with each other to form a substantially continuous pattern even though the line upon which they are driven follows a curve or a sharp angle.

In order to insure the proper contacting of the slugs against each other the machine is provided with means for positioning the slug about to be driven, then thrusting the same against the slug last driven with sufficient force to move the base with the driven slugs forward just enough to position the slug about to be driven beneath the driver of the machine so that when the driver descends the positioned slug will be driven with its wall in contact with the wall of the last driven slug.

The machine embodying the preferred form of my invention illustrated in the accompanying drawing comprises a frame having sides 1 and 2 connected at their lower ends by suitable tie rods 3 and 4 and at their upper ends by a tie rod 5 and also by an intermediate, preferably square, girder 6, the tie rod 5 and girder 6 forming guides for the driver supporting mechanism which will hereinafter be more fully described.

The means for supporting the work or base into which the units or slugs are driven preferably comprises a table 7 having a flat work supporting surface and so mounted that the work supporting surface may be positioned in angular relation to the path of the driver. As illustrated herein brackets 8, projecting from the under-surface of the table near one end thereof, are pivotally mounted upon a stud or studs 9 which project from or extend through the tie rods 3 and 4. Other brackets 10 extend downwardly from the under-face of the table near its opposite end and are connected at their lower ends by a tie rod 11 having a winged nut 12 by means of which the brackets 10 may be pressed toward each other. A shaft 13 is journalled in the brackets 10 and has an eccentric portion 14 which rests upon the tie rods 3 and 4 and supports the table 7. By rotating the shaft 13, which is provided with a milled head 15 for such purpose, the cam 14 may be caused to raise or lower the table and the table may be clamped in a desired position by tightening the winged nut 12 so as to clamp the brackets 10 firmly against the ends of the cam portion 14. By reason of this construction the surface of the work may be held at any desired angle to the path of the driver so that the units or slugs may be driven into the base at any desired inclination thereto, such for example, as is required to give the proper cross sectional form to a pattern for casting a die.

Figure 5:
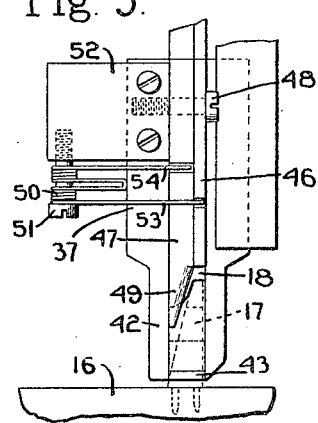
Fig. 5 is a rear elevation of the unit positioning means showing in dotted lines a preferred form of slug which has been affixed to a suitable base.
Figure 7:
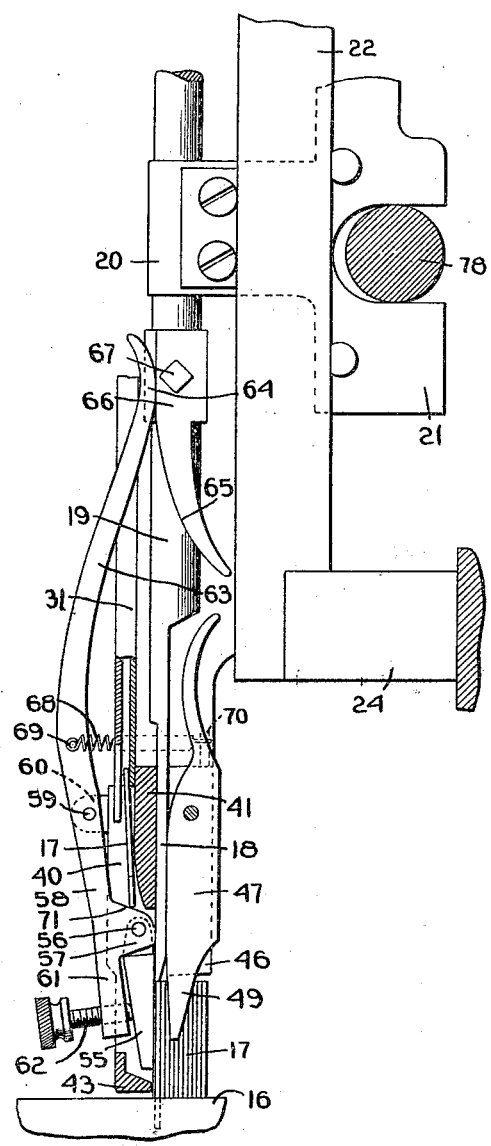
Fig. 7 is a detail view, partly in vertical section, of the unit or slug positioning means and the driving means, showing the parts in the position in which it feeds the work and holds the slug during the driving operation.
Figure 8:
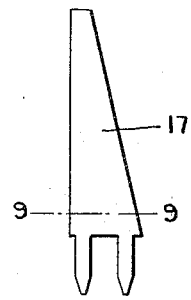
Fig. 8 is an elevation of a preferred form of unit or slug adapted for the formation of a die or die pattern.
Figure 9:
Fig. 9 is a transverse sectional view on lines 9—9, Fig. 8.

The work is illustrated herein as a wooden base 16 into which a series of slugs 17, having the form illustrated in Figs. 5, 8 and 9, are driven for the purpose of forming a die or the pattern for a die. The driving mechanism for setting the units or slugs into the base 16 comprises a driver 18 which desirably may be the reduced lower end portion of a rod 19 which is connected to a laterally extending bracket 20 of a cross head 21 which is slidably journalled in a suitable way in a driving supporting member 22 which is attached to brackets 23 and 24 which are slidably mounted respectively upon the guide rod 5 and girder 6. For convenience in construction the driving supporting member may be made in the form of two plates 22 and 22ˣ suitably connected together and formed respectively with guide-ways for the driver and for the cross head which actuates said driver.

The bracket 24 is provided with a clamping member 25 which embraces the girder 6 and is adapted to be firmly secured thereto by a screw 26 having a milled head which may be easily grasped by the operator. By reason of this construction the driving mechanism may be shifted transversely of the table so that it may be positioned in any desired relation to the work or base to which the units or slugs are adapted to be affixed.

In order to provide means for automatically delivering a series of slugs to the driver a suitable reservoir for the units or slugs is provided with means operable to deliver the units or slugs therefrom into a suitable chute through which they are carried to the driving mechanism. In the preferred construction disclosed herein the reservoir is in the form of a chute 27 which may be of sheet metal, the lower end of which extends through and fits a socket 28 in the upper portion of the driver supporting and guiding member 22. The lower wall of the chute 27 desirably is provided with a rib 29 which engages between the penetrating prongs of the units 17 and serves to hold them in proper position. The lower open end of the chute is closed by a plate 30 which is secured to the face of the driver supporting member 22 and is spaced therefrom a distance equal to, or very slightly greater, than the thickness of one of the units or slugs.

A chute 31, the upper end of which communicates with the space between the plate 30 and the driver supporting member 22, leads from said member to the mechanism for positioning the unit or slug in the path of the driver which will hereinafter be more fully described.

Means preferably in the form of a leaf spring 32 are provided for supporting the lowermost unit or slug in the chute. As illustrated herein this spring is curved in such a manner as to lie against the inner wall of the plate 30 with its upper end in engagement with the lowermost unit or slug and curved backwardly therebeneath so that when the slug is pressed downwardly it will force the spring aside and permit the unit or slug to pass.

Any suitable means may be provided for delivering the lowermost slug from the chute. As illustrated herein this is accomplished by a delivery plunger which is in the form of a flat plate 33 slidably mounted at its lower end in the space between the plate 30 and the driver supporting member 22. The upper end of the delivery plunger 33 is connected to a bracket 34 which is adjustably secured by a set screw 35 to the rod 19 of the driver. In the operation of the machine, therefore, the vertical reciprocation of the driver causes the delivery plunger 33 to descend until its lower end engages the upper end of the lowermost unit or slug in the chute. Upon further descent of the driver the delivery plunger forces the slug downwardly thereby bending aside the spring 32 until the slug has passed beyond it into the chute 31 from which it drops by gravity into the unit positioning means. Upon the upward reciprocation of the driver the delivery plunger will be withdrawn sufficiently to permit the next lowermost unit in the chute to engage the plate 30.

The units or slugs may be retained in the chute and forced downwardly by a suitable weight 36 slidably mounted in the chute, or by a spring, or any other suitable means.

The lower end of the chute 31 delivers the unit or slug to a positioning mechanism which may be operated to hold the unit or slug in the path of the driver. In the present invention this positioning means is so constructed as to have a further function of thrusting the unit to be driven against the face of the last unit which has already been driven with sufficient force to move the work or base forward the thickness of a unit or slug so that when the driver descends to force the positioned unit into the base it will be held firmly in contact with the previously driven unit or slug.

A preferred form of positioning means illustrated in the accompanying drawing comprises a block 37 which is secured to the lower end of the driver supporting member 22 by suitable screws 38. The body of the block is provided with two vertical channels 39 and 40 which are separated by a thin web 41. The lower portion of the block is provided with an extension 42 having at its bottom a transverse ledge 43 provided with an upwardly extending flange 44 and having a rearwardly inclined face 45 adapted temporarily to engage and support the lower ends of the units or slugs while they are being engaged by the positioning members.

The means for positioning the units or slugs comprises co-operating fingers which grasp the unit or slug after it has dropped downwardly so that its lower end rests upon the inclined face 45 of the extension 42. As disclosed herein the positioning mechanism comprises two rear holding fingers 46 and 47 which are pivotally mounted upon a stud, preferably a screw 48, extending transversely across the recess 39 of the holder block 37. The finger 46 is shorter than the finger 47 and preferably corresponds to the width of the upper end of the slug 17, while the longer finger 47 has a beveled and tapered extension 49 which extends down alongside the edge of the slug 17, and serves to guide the slug during the entire time it is being forced into the base.

The fingers 46 and 47, which are arranged to engage the rear side of the slug, are normally forced forward by a spring 50 which is coiled upon the stem of a screw 51 suitably anchored in a bracket 52 of the block 37, the end portions 53 and 54 of said spring respectively engaging notches in the rear walls of the fingers 46 and 47.

A co-operating holding or positioning finger 55 is provided to engage the front side of the unit or slug about to be driven. This finger 55 desirably is pivotally mounted at its upper end upon a stud 56 which is seated in a boss 57 which projects rearwardly from a lever 58 which is pivotally mounted upon a stud 59 carried in ears 60 projecting forwardly from the block 37. The lever 58 is designed to serve the double purpose of supporting the finger 55 and acting to force the slug about to be driven against an already driven slug, and at the same time to bring the upper end of the slug to be driven beneath the driver. In order to accomplish this purpose the lower end of the lever 58 is provided with an extension 61 in which a screw 62 is seated and through which it extends in such a manner as to engage the finger 55 as the lever is actuated. By adjusting the position of the screw 62 the action of the finger 55 may be varied either to force the slugs together at the top or bottom as may be required by the different kinds of slugs used or necessitated to follow an irregularly shaped pattern.

Any suitable means may be provided for actuating the lever 58 in synchronism with the driving mechanism. Preferably, however, this lever is actuated directly from the driver itself. As disclosed herein the lever 58 comprises an upwardly extending arm or tail 63 having a curved end 64 which is positioned to engage the curved face of a cam 65 projecting downwardly from a bracket or collar 66 which is adjustably secured by a set screw 67 to the rod 19 of the driver 18.

Figure 3:
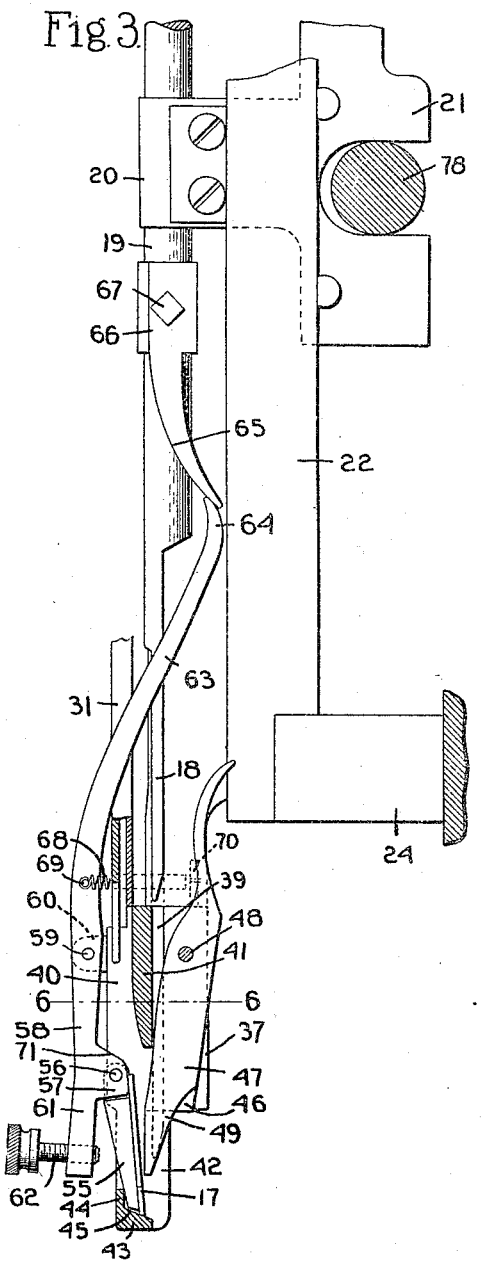
Fig. 3 is a detail view, partly in vertical section, of the unit or slug positioning means and the driving means.

A spring 68, connected at one end to a stud 69 upon the tail portion 63 of the lever 58 and at its other end to a stud 70 projecting upwardly from the block 37, normally retains the lever 58 in the position illustrated in Fig. 3 which enables the slug to drop between the fingers 46 and 47 and the co-operating finger 55. It will be noted that the chute communicates with the upper end of the recess 40 in the block 37 and the slug dropping therefrom will fall between the web 41 and the lever 58.

In the operation of the machine the unit or slug is dropped from the chute when the lower end of the lever is moved rearwardly to position the slug about to be affixed, so that the lower end of the dropped unit or slug will rest upon a ledge 71 provided by the upper surface of the boss 57 of said lever. When the driver, however, is elevated and the lever moved by the spring 68 to the position shown in Fig. 3, the unit or slug will drop from the ledge 71 between the fingers 46 and 47 and the co-operating finger 55 in the position illustrated in Fig. 3.

It will be noted that the driver 18 descends through the recess 39 in the block upon the opposite side of the web 41 and in the operation of the machine the screw 62 will be so adjusted that the lever 58, when acted upon by the cam 65, will force the slug rearwardly until the upper end of the slug or unit lies directly beneath the end of the driver 18. In doing this the slug is thrust against the last driven slug with sufficient force to move the base, into which the slugs are driven, rearwardly the thickness of one slug, so that the descending plunger will press the slug which it drives firmly against the last driven slug as it forces the same into the base.

Inasmuch as the base, into which the units or slugs are driven, rests upon the smooth surface of the supporting table, the base may be readily guided by hand in such a manner that the assembled slugs will form any desired pattern. In order to enable the slugs to be driven along a predetermined line, or to follow the contour of a platen or pattern, at a sufficient distance therefrom to provide for shrinkage of the metal, where the machine is employed to produce a pattern for dies, a guiding finger is provided which may be superposed above a line, or caused to engage the edge of a pattern or platen. As illustrated herein a guiding finger or index 72 is pivotally mounted at its upper end between ears extending upwardly from the block 37 upon a stud 73 and is provided with means for adjusting its lower end toward and from the positioning means. The mechanism for thus adjusting the finger, as illustrated herein, comprises a bolt 74 having a nut 75 engaging the outer side of the finger 72 and tending to draw the finger toward the positioning means, and a thrust screw 76, having screw threaded engagement with the finger and abutting at its end against the side of the block 37, tending to force the guiding or index finger 72 away from the positioning means. Thus the finger 72 may be positioned in any desired relation to the path in which the successive units or slugs are to be driven.

Any suitable mechanism may be employed for actuating the driver. A preferred mechanism is disclosed herein which is operable to actuate the driver when the latter is in any adjusted position relatively to the base, means also being provided for varying the stroke of the driver to enable it to operate upon units or slugs of different lengths.

In the preferred mechanism the cross head 21 is provided with a recess 77 which engages a rod 78 which extends in parallelism with the guide 5 and girder 6 and is supported at its ends in arms 79 and 80 which are connected to, and project laterally from, a rock shaft 81 which is journalled in suitable bosses 82 and 83 in the side frames 1 and 2. A tie rod 84 also connects the arms 79 and 80 to give rigidity to the structure. The arm 79 desirably is provided with an extension 85 through which power is transmitted to operate the rock shaft, the arm 79 and extension 85 preferably forming an integral lever.

While any suitable means may be provided for oscillating the rock shaft 81, means are disclosed herein which will enable the amplitude of oscillation of the rock shaft and its arms, and consequently the extent of reciprocation of the driver, to be accurately adjusted. As shown herein a strap 86 connected to the end of the extension 85 which engages and preferably embraces an adjustable actuator, desirably in the form of a sector 87 which is pivotally mounted at one end upon a stud 88 located at the upper end of an arm 89 which is provided at its lower end with a boss 90 which is mounted upon a driving shaft 91 which preferably is a crank shaft having a crank 92. The opposite end of the sector 87 is pivotally connected to a stud 93 upon the upper end of a pitman 94, the lower end of which engages the crank 92. The rotation, therefore, of the crank shaft 91 will cause the pitman 94 to reciprocate thereby oscillating the sector 87 about its pivot 88 and imparting through the strap 86 an oscillating movement to the arm 85 of the rock shaft 81, thereby causing an oscillation of the arms 79 and 80 which engage and reciprocate the cross head 21 which carries the driver 18.

In order to vary the extent of reciprocation of the driver, means are provided for moving the arm 89 to which the sector is pivoted in such a manner that the distance between the strap 86 and the pivot 88, about which the sector swings, may be varied. As illustrated herein the upper end of the arm 89 is provided with a bracket or boss 95 having a screw threaded aperture which receives one end of a screw 96, the other end of which has a reduced portion 97 which is rotatably mounted in a bracket 98 which is secured to the girder 6. The reduced portion 97 of the screw provides a shoulder 99 which abuts against the rear wall of the bracket 98. A hand wheel 100 is keyed upon the reduced portion 97 of the screw and has its hub abutting against the opposite wall of the bracket 98. A screw 101, seated axially in the screw 96, engages the forward face of the hand wheel 100 and when set up serves to force the hub of the hand wheel 100 against the bracket 97 with sufficient force to cause the shoulder 99 which engages the opposite face of said bracket to co-operate with it in clamping the screw against rotation.

Any suitable means may be provided for rotating the driving or crank shaft 91. Preferably, said shaft is driven by a pulley 102 which is connected to the shaft by a suitable clutch mechanism having a lever 103 operated by a spring 104 in such a manner as normally to stop the rotation of the shaft upon every revolution, but which may be actuated by a suitable pedal mechanism to cause a continuous rotation of the shaft.

It will be understood that the embodiment of the invention disclosed herein is of an illustrative character and is not restrictive and that various modifications may be made within the spirit and scope of the following claims.

Having thus described my invention, what I claim as new and desire to secure by Letters Patent, is:

1. A machine for affixing a series of abutting units to a base, comprising means for supporting said base, means for delivering a unit to be affixed in proximity to an affixed unit, driving means and means for forcing the delivered unit against an affixed unit and acting by continued movement to advance said base and to position the delivered unit beneath said driving means and means for actuating said driving means.

2. A machine for affixing a series of abutting units to a base, comprising a table for supporting said base, means for delivering a unit in proximity to an affixed unit, driving means and a lever operable by said driving means to force said delivered unit against an affixed unit and thereby to advance said base and to position said delivered unit beneath said driving means.

3. A machine for affixing a series of abutting units to a base, comprising means for supporting said base, unit driving means, positioning means including means for holding the unit about to be driven against an affixed unit, means for moving said holding means laterally to cause the same to advance said base and to place the unit to be driven beneath said driving means and means for actuating said driving means.

4. A machine for affixing a series of abutting units to a base, comprising means for supporting said base, unit driving means and means for actuating the same, unit holding means including a plurality of fingers for holding the unit about to be driven and means operable by the initial movement of said driving means to move said unit holding means laterally and by forcing the unit held thereby against an affixed unit to advance the base and to position the unit to be driven beneath the driving means.

5. A machine for driving a series of units into a base, comprising means for supporting said base, unit driving means and means for actuating the same, unit positioning means including a plurality of yieldable fingers adapted to engage one side of said unit, a co-operating finger operable to engage the opposite side of said unit and means for actuating said co-operating finger to move said unit beneath said driving means in advance of the descent of said driving means.

6. A machine for driving a series of units into a base, comprising means for supporting said base, unit driving means, and means for actuating the same, a plurality of yieldable fingers of different lengths adapted to engage one side of said unit, a lever having a co-operating finger pivotally connected thereto adapted to engage the opposite side of said unit and means for actuating said lever to move said unit laterally beneath said driving means.

7. A machine for driving a series of units into a base, comprising means for supporting said base, unit driving means and means for actuating the same, a plurality of yieldable fingers of different lengths adapted to engage one side of said unit, a lever having a co-operating finger pivotally connected thereto adapted to engage the opposite side of said unit, means for actuating said lever to move said unit laterally beneath said driving means and means for adjusting the extent of movement imparted to said co-operating finger by said lever.

8. A machine for driving a series of units into a base comprising means for supporting said base, a reservoir for said units, a driver and means for reciprocating the same, means operable upon the actuation of said driver for delivering a unit from said reservoir during the descent of said driver, a lever operable to force the delivered unit against the previously driven unit and a cam on said driver positioned to engage and actuate said lever before the driver engages the positioned unit.

9. A machine for driving a series of units into a base, comprising a table for supporting said base, unit driving means and means for actuating the same, means for delivering a unit to be affixed in proximity to an affixed unit, means for forcing said delivered unit against an affixed unit and acting by continued movement to advance said base to position the delivered unit beneath said driving means, and an index adapted to follow a line or pattern upon said base for determining the position of the base whereby the units may be assembled to produce a predetermined pattern.

10. A machine for driving a series of units into a base, comprising a table for supporting said base, unit driving means and means for actuating the same, means for delivering a unit to be affixed in proximity to an affixed unit, means for forcing said delivered unit against an affixed unit and acting by continued movement to advance said base to position the delivered unit beneath said driving means, an index adapted to follow a line or pattern upon said base for determining the position of the base whereby the units may be assembled to produce a predetermined pattern and means for adjusting said index relatively to said positioned units.

11. A machine for driving a series of units into a base, comprising a pivotally mounted support for said base, unit driving means and means for actuating the same, adjusting means for positioning said base in angular relation to the path of said driving means, including a rotatable cam engaging said support and means for securing said cam in adjusted positions.

12. A machine for driving a series of units into a base, comprising a support for the base, a driver, a lever having one end engaging said driver, an actuator adjustably connected to the other end of said lever, an arm pivotally supporting one end of said actuator, means for reciprocating the other end of said actuator and means for adjusting the actuator supporting arm in the direction of the length of said actuator whereby the effective leverage of said actuator upon said lever may be varied.

13. A machine for driving a series of units into a base, comprising a support for the base, a driver, a lever having one end engaging said driver, an actuator adjustably connected to the other end of said lever, an arm pivotally supporting one end of said actuator, means for reciprocating the other end of said actuator and a stationary adjusting screw engaging said arm operable to adjust said actuator in the direction of its length whereby the effective leverage of said actuator upon said lever may be varied.

In testimony whereof, I have signed my name to this specification.

CARL G. ANDERSON.